Oct. 30, 1962 R. W. ANTHONY 3,060,811
APPARATUS FOR MACHINING SURFACES OF GEAR TEETH
Filed Sept. 8, 1958 3 Sheets-Sheet 2
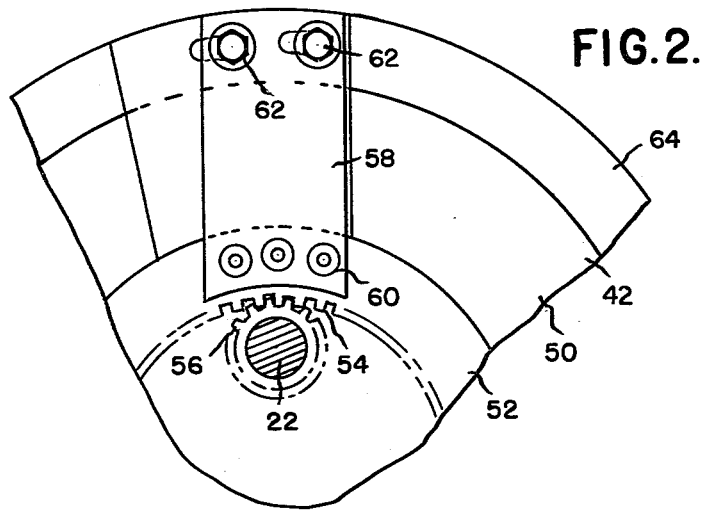
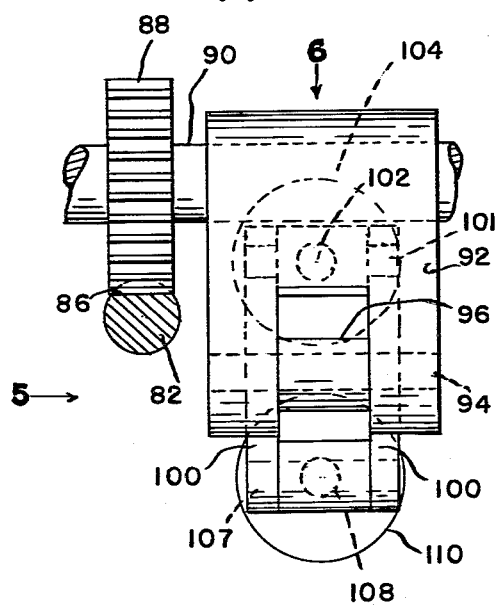
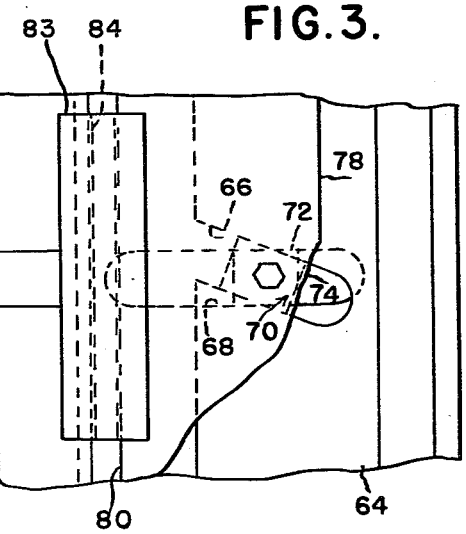
INVENTOR.
RUSSEL W. ANTHONY
BY
ATTORNEYS

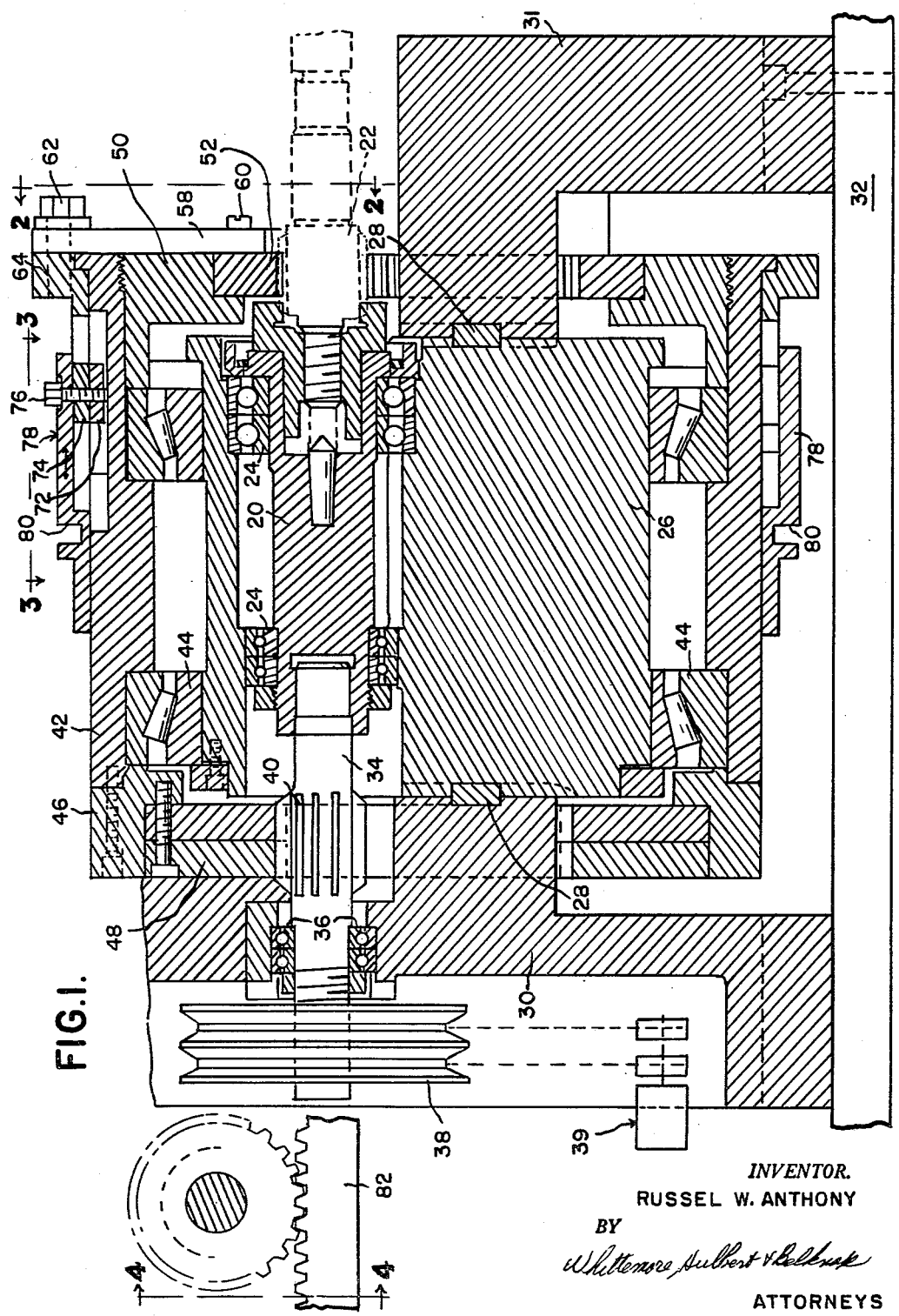

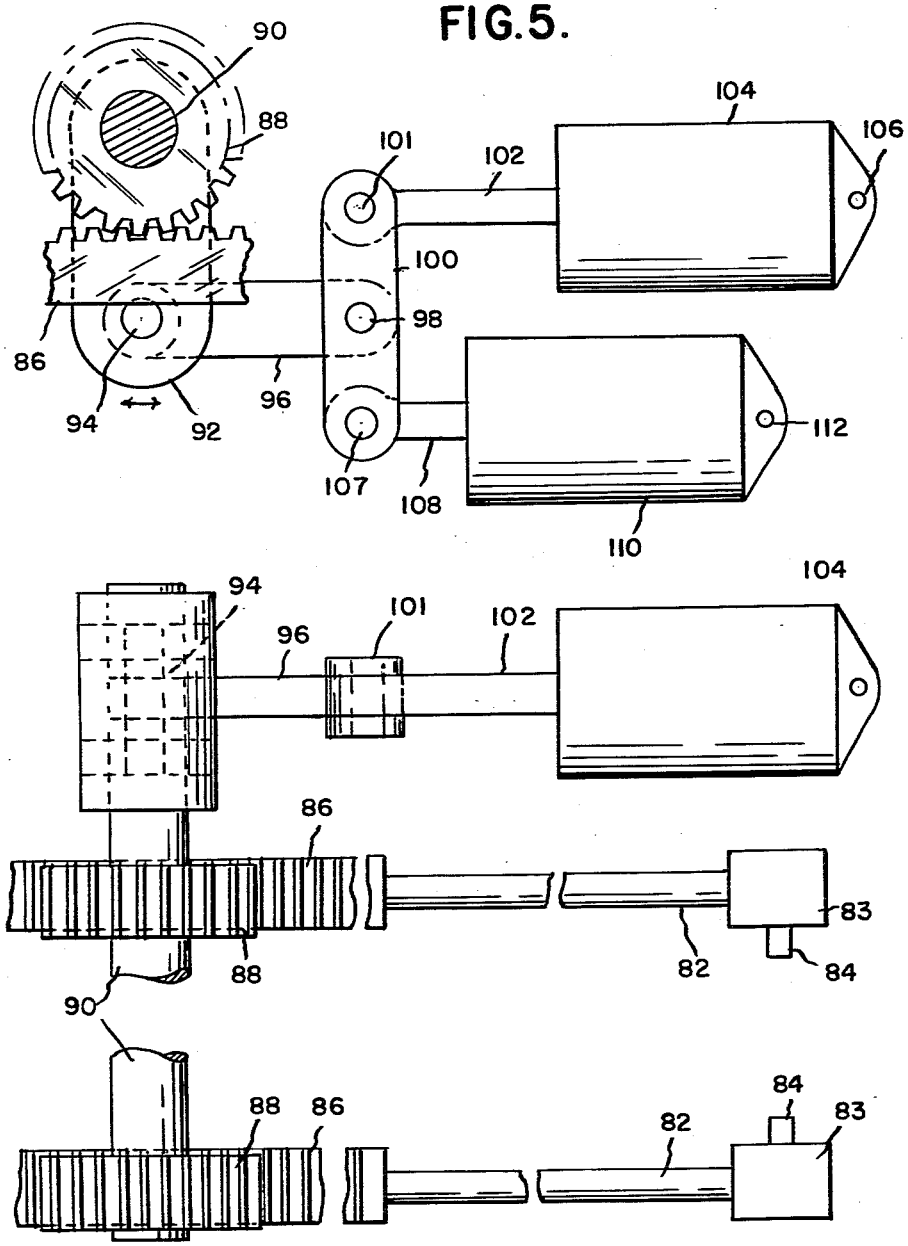

3,060,811
APPARATUS FOR MACHINING SURFACES
OF GEAR TEETH
Russel W. Anthony, Detroit, Mich., assignor to National Broach & Machine Company, Detroit, Mich., a corporation of Michigan
Filed Sept. 8, 1958, Ser. No. 759,623
7 Claims. (Cl. 90—1.6)

The present invention relates to apparatus for machining surfaces of gear teeth, and more particularly to an apparatus designed to take cuts on the surfaces of gear teeth in a direction from the crests toward the roots thereof.

It is an object of the present invention to provide an apparatus for cutting gear tooth surfaces in which a series of cutting blades or teeth having cutting edges at the top corners thereof are rotated about a central axis and a gear member is rotated about a fixed eccentric axis with the blades cutting the surfaces of the gear teeth from the crests towards the roots thereof.

It is a further object of the present invention to provide apparatus for cutting gear tooth surfaces comprising a rotatably annular cutter having radially inwardly directed cutting blades, a work support, means for rotating the work support about an axis spaced from the cutter axis and means for imparting the rotation of the work support to the annular cutter.

Another object of the present invention is to provide apparatus as described in the preceding paragraph wherein the work support has fixed thereto a master pinion gear enmeshed with an internal gear fixed to the annular cutter, in a ratio corresponding to the ratio between work gear teeth and the cutter blades, so that rotation of the work support will impart rotation to the annular cutter.

These and other objects will become more apparent when a preferred embodiment is described in connection with the drawings, in which:

FIG. 1 is a sectioned view of a machine embodiment of this invention;

FIG. 2 is a partial end elevation taken from the direction of the arrows 2—2 of FIG. 1;

FIG. 3 is a partial plan view taken from the direction of the arrows 3—3 in FIG. 1 and showing a means for effecting circumferential feed adjustment of the cutter;

FIG. 4 is a view taken from the direction of the arrows 4—4 of FIG. 1 showing the drive for the feed adjustment of FIG. 3;

FIG. 5 is an elevational view taken from the direction of arrow 5 of the drive mechanism shown in FIG. 4; and FIG. 6 is a plan view of the feed drive shown in FIG. 4 taken from the direction of arrow 6.

Referring now to the drawings a work support or spindle 20 holding gear workpiece 22 is rotatably mounted in bearings 24 in fixed cylinder 26 which is keyed at either end by keys 28 to stanchions 30, 31 which are bolted to bedplate 32 of the machine. Drivingly connected to spindle 20 is shaft 34 which is journaled for rotation in bearings 36 mounted in stanchion 30 and which is driven through shaft attached pulleys 38. Carried by shaft 34 is pinion gear 40.

Drum 42 is rotatably mounted about cylinder 26 on bearings 44 and has bolted to one end thereof annular retainer 46 which has fixed thereto dual internal gears 48 which are enmeshed with pinion 40 providing a rotating drive to drum 42. Gears 48 are angularly adjustable relative one another for reducing gear back lash by means (not shown) which are well known to the art.

Threadedly engaged to the other end of drum 42 is retainer ring 50 carrying cutting tool 52 for circumferential feed adjustment therein. Cutter 52 has radially inwardly projecting straight sided teeth or cutting blades 54 (FIG. 2), each of which has a cutting corner at the end thereof for cutting sides of the gear teeth 56 of work gear 22 during relative rotation between cutter 52 and workpiece gear 22, in a manner more fully described in the issued patent to Benjamin F. Bregi et al. entitled "Apparatus for Cutting Gear Tooth Surfaces," Patent No. 2,882,798, issued on April 21, 1959.

As pulley 38 is rotated by driving means 39, shown schematically, pinion 40 drives drum 42 and cutter 52 through internal gears 48. Work carrying spindle 20 is also rotated, since it is fixed to the end of driven shaft 34, and rotates workpiece gear 22. The ratio between pinion gear 40 and internal gear 48 corresponds to the ratio between cutting blades 54 and teeth 56 so that the proper cutting action between the blades and the teeth takes place. The cutting action is carried out at one side only of the gear teeth and takes place during approach between the blade of the cutter and the teeth of the gear. The pulley drive 38 is reversible so that both sides of the gear teeth 56 may be cut by the blades 54.

As will be appreciated, the depth of cut of the gear teeth 56 may be increased by circumferentially adjusting cutter 52 in retainer ring 50 in the proper amount and direction. Means for accomplishing this include an adjustment plate 58 which is secured at its lower end by bolts 60 to cutter 52 and is adjustably attached at its upper end through bolts 62 to adjustment collar 64 which has formed therein an inclined slot 66 (FIG. 3). Formed in drum 42, below slot 66 in collar 64, is an axial slot 68 and riding in slots 66, 68 is a guide block 70 which has a lower portion 72 conforming to axial slot 68 and an upper portion 74 conforming to inclined slot 66. Block 70 is attached by bolt 76 to feed sleeve 78 which is mounted about and axially slidable relative to drum 42 and which has formed in its outer periphery a pin receiving groove 80. The elements attached to and rotating with drum 42 are, therefore, gears 48, retainer 46, sleeve 78, ring 50, collar 64, plate 58 and cutter 52.

As will be understood, axial movement of feed sleeve 78 and attached block 70 will effect relative circumferential movement between collar 64 (and its attached cutter 52) and retainer ring 50, thereby effecting a feed adjustment. An initial or set-up adjustment is effected by loosening bolts 62 which connect plate 58 and collar 64 and causing the proper adjustment therebetween and then tightening bolt 62.

Means for imparting axial movement to feed sleeve 78 are shown in the drawings and especially in FIGS. 4–6 and will now be described. Mounted for axial movement on diametrically opposed sides of the machine are feed rods 82 each of which has at one end a block 83 with a laterally extending tongue 84 insertable in groove 80 for moving sleeve 78 (FIGS. 3 and 6) and at the other end a gear rack 86 which is engageable with a pinion 88 attached to a shaft 90. Rotation of shaft 90 and pinions 88 will impart an axial movement to the rods 82 and sleeve 78. Two rods 82 are used for a balanced actuation of sleeve 78.

Means for rotating shaft 90 include a bifurcated arm 92 fixed thereto which is pivoted at 94 to one end of a link 96. Pivoted to the other end of link 96 at 98 is a bar assembly 100 which is pivoted at 101 to piston rod 102 of rapid traverse cylinder 104 which is supported by a machine fixed pivot 106. Pivoted to the other end of bar assembly 100 at 107 is piston rod 108 operated by a feed cylinder 110 which is supported by a machine fixed pivot 112. Cylinders 104 and 110 are supplied with fluid pressure from means, not shown, upon receiving a feed signal. Rapid traverse cylinder 104 is operable to move its piston rod 102 rapidly, pivoting bar assembly 100 about pivot 107 until rod 90 and pinions 88 have moved gear racks 86 and adjustment rods 82 to the area of fine adjustment wherein the feed cylinder 110 is operable to accurately move rod 108 pivoting bar 100 about pivot 101 until adjustment rods 82 have moved feed sleeve 78, through the engagement of tongue 84 in groove 80, to the desired position for proper adjustment of cutter 52.

A feed operation, then, commences through the sequential energization of cylinders 104 and 110 pivoting bar 100 and rotating arm 92 and shaft 90, turning pinions 88 against racks 86 causing longitudinal movement of rods 82 and feed sleeve 78, which moves guide block 70 in slots 66, 68 to cause circumferential movement of collar 64 and cutter 52.

As mentioned, pulley 38 is capable of a reverse drive to cut the opposite side of the work gear teeth. A corresponding adjustment of the feed sleeve 78 will properly adjust the cutting blades 56 for cutting the opposite teeth sides.

In the apparatus of this invention the cutter and the workpiece are balanced and rotated about fixed axes so that no eccentric or unbalanced load must be compensated for. The capabilities of the apparatus of this are similar to those described for the machine in the above mentioned Bregi invention with the structure of this invention providing for the rotation of balanced units which increases accuracy and machine life.

This machine is equally capable of cutting internal gear teeth by reversing positions of the workpiece and cutter units shown in the preferred embodiment.

The cutter teeth may be adapted for cutting while moving into and/or out of the tooth space of the workpiece. One way this may be accomplished is by forming longitudinal or axial grooves in the teeth of the cutter wherein two oppositely facing cutting edges are provided to accommodate cutting as the cutter teeth enter into or leave a workpiece tooth space.

The radial adjustments and advantages accruing thereto of the apparatus shown in the Bregi invention may likewise be adapted to the apparatus of this invention.

The drawings and the foregoing specification constitute a description of the improved apparatus for machining surfaces of gear teeth in such full, clear, concise and exact terms as to enable any person skilled in the art to practice the invention, the scope of which is indicated by the appended claims.

What I claim as my invention is:

1. Apparatus for machining surfaces of gear teeth comprising a stationary frame member having a first member journaled for rotation therein about a center axis and carrying gear means therewith, a second member rotatably mounted in said frame about an eccentric axis and carrying gear means therewith enmeshed with said first member gear means, one of said first and second members having a work gear fixed thereto and the other of said members having cutting teeth fixed thereto registrable with the teeth on said work gear, driving means for rotating one of said first and second members causing rotation of the other of said members through said gear means and causing said cutting teeth to engage said work teeth in a crest to root direction, adjustment means for arcuately adjusting one of said cutter and work gear relative its respective rotating member, said adjustment means comprising an axially movable sleeve mounted to said respective rotary member, said sleeve being connected to one of said cutter and work gear through a cam member whereby axial movement of said sleeve will move, said one of said cutter and work gear arcuately of said respective rotary member.

2. Apparatus for machining surfaces of gear teeth comprising a stationary frame member having a fixed cylinder, a cutter having radial inwardly extending teeth, a cutter carrying drum journaled for rotation about said cylinder and carrying gear means therewith, a work gear carrying spindle rotatably mounted in said cylinder about an eccentric axis and carrying gear means therewith enmeshed with said drum gear means in a ratio corresponding to ratio between the cutter and work gear teeth, said cutter teeth being registrable with the teeth on said work gear so that as said spindle is rotated said drum is rotated causing said cutter teeth to engage said work teeth in a crest to root direction, an axially movable sleeve mounted on said drum and attached to said cutter through a cam slot whereby axial movement of said sleeve will move said cutter circumferentially relative said drum to effect a feed adjustment.

3. Apparatus for machining surfaces of gear teeth comprising a stationary frame including a body, first and second support means rotatably carried by said body about substantially fixed axes, both of said support means carrying gear means which are in mesh with each other, a work gear member fixed to one of said support means, a cutting member carried by the other of said support means, means for rotating one of said first and second support means directly and for imparting rotation to the other of said support means through the meshed gear means, and means on one of said support means for superimposing on its rotation a circumferential depth feed adjustment of the member carried thereby relative to the member carried by the other support means, said last mentioned means including an axially movable sleeve attached to the member being adjusted through a cam slot, said sleeve being movable axially to move said member circumferentially relative to the member carried by the other support means.

4. Apparatus for machining surfaces of gear teeth comprising a stationary frame having mounted thereon internal and external bearing means eccentric with respect to each other, rotary supports on each of said bearing means, both of said rotary supports being rotatable about substantially fixed axes, gear means carried by said supports and in mesh with each other, a work gear fixed to one of said supports and cutting means carried by the other of said supports, said cutting means including a gear-like cutter having cutting teeth provided with cutting edges formed by the intersection between the top and flanks thereof to engage the work gear during the cutting strokes, whereby the cutting edges engage the sides of the work gear teeth in a crest to root cutting direction, means connected to one of said supports for rotating said one support and causing rotation of the other support through the meshed gear means, and means on the other of said supports for effecting circumferential movement of said cutting means relative to the work gear.

5. An apparatus defined in claim 4 wherein said work gear is an externally toothed member which is mounted on the rotary support carried by said internal bearing means and said gear-like cutter is an internally toothed member which is mounted on the rotary support carried by said external bearing means.

6. Apparatus for machining surfaces of gear teeth comprising a stationary frame including a body having an opening extending therethrough, internal bearing means mounted in said opening and external bearing means mounted on said body, rotary supports on each of said bearing means, both of said rotary supports being rotatable about substantially fixed axes, gear means carried by said supports and in mesh with each other, a work gear fixed to one of said supports and cutting means carried by the other of said supports, said cutting means including a gear-like cutter having cutting teeth provided with cutting edges formed by the intersection between the top and flanks thereof to engage the work gear during the cutting strokes, whereby the cutting edges engage the sides of the work gear teeth in a crest to root cutting direction, means connected to one of said supports for rotating said one support and causing rotation of the other support through the meshed gear means, and means on the other of said supports for effecting circumferential movement of said cutting means relative to the work gear.

7. Apparatus for machining surfaces of gear teeth comprising a stationary frame having internal and external bearing means eccentric with respect to each other, a work support carried by said internal bearing means, a cutter support carried by said external bearing means, both of said supports being rotatable about substantially fixed axes, gear means carried by said supports and in mesh with each other, a work gear fixed to said work support and cutting means carried by the said support, said cutting means including a gear-like cutter having cutting teeth provided with cutting edges formed by the intersection between the top and flanks thereof to engage the work gear during the cutting strokes, whereby the cutting edges engage the sides of the work gear teeth in a crest to root cutting direction, means connected to said work support for rotating said support and causing rotation of the cutter support through the meshed gear means, and means on the other of said supports for effecting circumferential movement of said cutting means relative to the work gear.

References Cited in the file of this patent

UNITED STATES PATENTS

| | | |
|---|---|---|
| 1,724,168 | Barnes | Aug. 13, 1929 |
| 2,257,195 | Rovick | Sept. 30, 1941 |
| 2,660,929 | Praeg | Dec. 1, 1953 |
| 2,780,146 | Saari | Feb. 5, 1957 |
| 2,851,930 | Praeg | Sept. 16, 1958 |
| 2,863,360 | Praeg | Dec. 9, 1958 |
| 2,882,798 | Bregi et al. | Apr. 21, 1959 |

FOREIGN PATENTS

| | | |
|---|---|---|
| 1,095,693 | France | Dec. 22, 1954 |